United States Patent
Yang et al.

(10) Patent No.: US 12,537,715 B2
(45) Date of Patent: Jan. 27, 2026

(54) FULL-ELECTRONIC TURNOUT SECURITY CONTROL SYSTEM FOR TRAIN-TO-TRAIN COMMUNICATION AND METHOD THEREOF

(71) Applicant: CASCO SIGNAL LTD., Shanghai (CN)

(72) Inventors: Chun Yang, Shanghai (CN); Jianhua Jiang, Shanghai (CN); Weijuan Li, Shanghai (CN); Qingbiao Xu, Shanghai (CN); Cheng Zhang, Shanghai (CN); Chao Li, Shanghai (CN); Zhenhua Hu, Shanghai (CN); Jun Wu, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 547 days.

(21) Appl. No.: 18/003,532

(22) PCT Filed: Sep. 23, 2021

(86) PCT No.: PCT/CN2021/119759
§ 371 (c)(1),
(2) Date: Dec. 28, 2022

(87) PCT Pub. No.: WO2022/121437
PCT Pub. Date: Jun. 16, 2022

(65) Prior Publication Data
US 2023/0254180 A1 Aug. 10, 2023

(30) Foreign Application Priority Data
Dec. 8, 2020 (CN) .......................... 202011425686.0

(51) Int. Cl.
*H04L 12/40* (2006.01)
*H04L 69/14* (2022.01)
(Continued)

(52) U.S. Cl.
CPC ........ *H04L 12/40032* (2013.01); *H04L 69/14* (2013.01); *H04L 69/18* (2013.01); *B61L 7/08* (2013.01)

(58) Field of Classification Search
CPC .... H04L 12/40032; H04L 69/14; H04L 69/18
See application file for complete search history.

(56) References Cited

U.S. PATENT DOCUMENTS 6,134,604 A * 10/2000 Soya ........................ H04L 12/40
714/48

FOREIGN PATENT DOCUMENTS

| CN | 106740992 A | * 5/2017 | ............. B61L 5/065 |
| CN | 108001483 A | 5/2018 | |

(Continued)

OTHER PUBLICATIONS

International Search Report (with English translation) and Written Opinion issued in PCT/CN2021/119759, dated Dec. 6, 2021, 10 pages provided.

*Primary Examiner* — Scott A Browne
(74) *Attorney, Agent, or Firm* — HSML P.C.

(57) ABSTRACT

The present invention relates to a full-electronic turnout security control system for a train-to-train communication and a method thereof. The system comprises: a communication module for realizing an external communication respectively with a resource manager and a maintenance system and an internal communication respectively with a turnout control module, a relay driving module and a relay collection module; the turnout control module for controlling rotation of a turnout and collecting a turnout representation; the relay driving module for driving a relay to turn on or off according to a turnout power source on or off command transmitted by the resource manager; the relay collection module for collecting an on or off state of the collection relay and respectively transmitting the state to the (Continued)

resource manager and the maintenance system through the communication module; and a relay for connecting the relay driving module, the relay collection module and a switch machine driving return line. Compared with the prior art, the present invention has advantages of greatly saving human labor cost and the like.

10 Claims, 2 Drawing Sheets

(51) Int. Cl.
*H04L 69/18* (2022.01)
*B61L 7/08* (2006.01)

(56) References Cited

FOREIGN PATENT DOCUMENTS

| | | |
|---|---|---|
| CN | 108032870 A | 5/2018 |
| CN | 112572531 A | 3/2021 |
| JP | 5766088 B2 | 8/2015 |

\* cited by examiner

FULL-ELECTRONIC TURNOUT SECURITY CONTROL SYSTEM FOR TRAIN-TO-TRAIN COMMUNICATION AND METHOD THEREOF

FIELD OF TECHNOLOGY

The present invention relates to a full-electronic turnout security control system and a method thereof, and in particular, relates to a full-electronic turnout security control system for a train-to-train communication and a method thereof.

BACKGROUND

In the present signal system of China, an interlocking system is used for controlling a signal of a station and a computer interlocking device has been promoted for being applied nearly 20 years, such that mature product structures and technical conditions have been formed. For a control logic and an external structure of a present computer interlocking device, an electrically-centralized interlocking system is still employed, and its external device performs security input and output control with a security relay as a medium. By controlling a security relay coil for picking up or falling down, an outdoor device action is manipulated. By a junction state of a relay, an outdoor device state is obtained. In order to realize an application scene of a turnout driving power source security control based on a train-to-train communication, it is necessary to build an air switch or a PLC circuit to control a turnout resource. Construction and subsequent operations of such air switch or PLC circuit are time-consuming and laborious. In addition, such a design principle still fails to satisfy requirements for smart turnout control, due to presence of numerous inconveniences for maintenance and protection of the air switch or PLC circuit.

SUMMARY

The objective of the present invention is to overcome the existing defect of the prior art by providing a full-electronic turnout security control system for a train-to-train communication and a method thereof.

The objective of the present invention can be realized through the following technical solution:

According to a first aspect of the present invention, there is provided a full-electronic turnout security control system for a train-to-train communication, comprising:
  a communication module for realizing an external communication respectively with a resource manager and a maintenance system and an internal communication respectively with a turnout control module, a relay driving module and a relay collection module;
  the turnout control module for controlling rotation of a turnout and collecting a turnout representation;
  the relay driving module for driving a relay to turn on or off according to a turnout power source on or off command transmitted by the resource manager;
  the relay collection module for collecting an on or off state of the collection relay and respectively transmitting the state to the resource manager and the maintenance system through the communication module; and
  a relay for connecting the relay driving module, the relay collection module and a switch machine driving return line.

As a preferred technical solution, the communication module receives a turnout control command and the turnout power source on or off command from the resource manager, and transmits turnout representation information from the turnout control module and the turnout power source on or off state information of the relay collection module to the resource manager.

As a preferred technical solution, monitoring information of the turnout control module, the relay driving module and the relay collection module are transmitted to the maintenance system through the communication module.

As a preferred technical solution, the turnout control module obtains a turnout control command from the communication module and operates a turnout fixedly or reversely according to the command.

As a preferred technical solution, if a turnout cannot be started in a timeout period, the turnout control module should cut off a power source of the turnout; and for a turnout in a normal working state, once the turnout is started, if the turnout control module issues a control command to interrupt or stop the turnout at the time, the turnout can also be driven continuously till completion of an action.

As a preferred technical solution, when the turnout control module receives an opposite driving command in a process of driving a turnout, the turnout should be controlled to be driven towards an opposite direction; and if the turnout cannot rotate in-place in a timeout period, the turnout control module should stop driving of the turnout after timeout.

As a preferred technical solution, the relay driving module transmits a driving command to the maintenance system through the communication module.

As a preferred technical solution, the relay is a 480-type relay.

As a preferred technical solution, when the relay driving module is driven to be turned on, the 480-type relay is turned on, in which case the relay collection module obtains an on state of the relay; and when the relay driving module is driven to be turned off, the 480-type relay is turned off, in which case the relay collection module obtains an off state of the relay.

According to another aspect of the present invention, there is provided a control method employing the full-electronic turnout security control system for a train-to-train communication, comprising the following steps:
  (1) performing an energizing initialization on an entire system to complete self-checking;
  (2) receiving, by a communication module, a 480-type relay on or off command and a turnout driving command from a resource manager, and transmitting the 480-type relay on or off command to a relay driving module and the turnout driving command to a turnout control module; controlling, by the relay driving module, to turn on or off a 480-type relay according to the 480-type relay on or off command; and checking, by a turnout control module, whether the turnout driving command is a command for an operation at a normal position or for an operation at a reverse position and simultaneously checking a state of a switch machine, turning on a driving circuit of the switch machine, and starting to drive the switch machine till the switch machine is driven in-place or a timeout period is reached;
  (3) continuously collecting, by the turnout control module, representation information and transmitting representation information and monitoring information to the communication module;

(4) continuously collecting, by the relay collection module, an on or off state of the 480-type relay and transmitting the state to the communication module; and (5) transmitting, by the communication module, turnout representation information and the on or off state of the 480-type relay to the resource manager, and further transmitting, by the communication module, turnout monitoring information and monitoring information of the relay driving module and the collection module to the maintenance system.

Compared with the prior art, the present invention has the following advantages:

1) Compared with a conventional practice for realizing on and off processing of a turnout power source by an air switch or PLC circuit, the system of the present invention employs a full-electronic module and a few relays for remote smart control over a turnout driving power source on a resource manager, thereby greatly saving human labor cost;

2) The system of the present invention employs a standardized full-electronic module to take the place of the air switch or PLC circuit, greatly reducing construction difficulties;

3) For the main body of the system of the present invention, a double 2-vote-2 architecture is employed, greatly improving security and reliability of the system; and 4) The system of the present invention is convenient for maintenance and a fault can be positioned and removed through warning information on a maintenance system.

Described above is merely an overview of the inventive scheme. In order to more apparently understand the technical means of the disclosure to implement in accordance with the contents of specification, and to more readily understand above and other objectives, features and advantages of the disclosure, specific embodiments of the disclosure are provided hereinafter.

DESCRIPTION OF THE EMBODIMENTS

Figure 1:
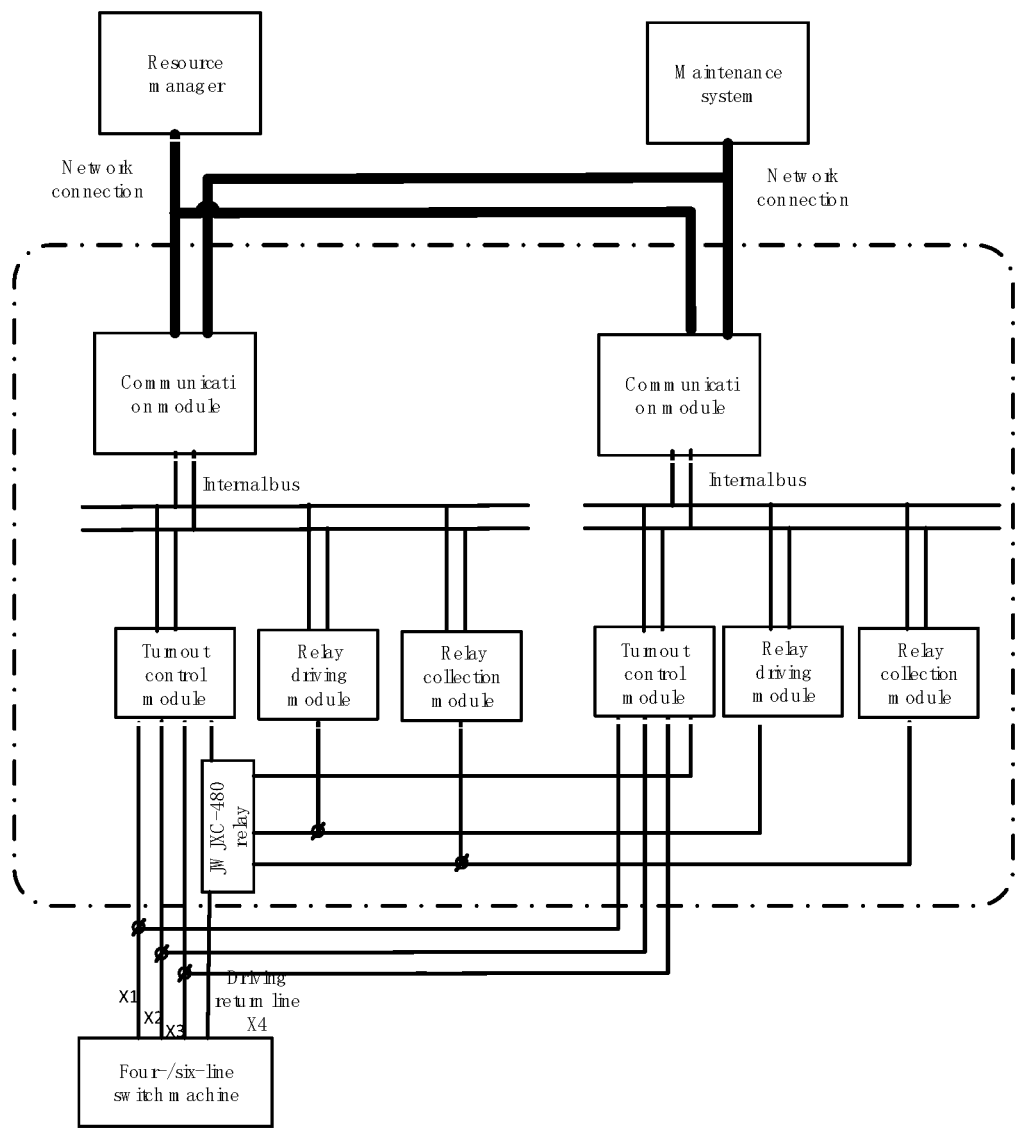
FIG. 1 is a structural diagram of the present invention.

The following clearly and completely describes the technical solutions in the embodiments of the present invention with reference to the accompanying drawings in the embodiments of the present invention. Apparently, the described embodiments are some but not all of the embodiments of the present invention. Based on the embodiments of the present invention, all of other embodiments obtained by a person of ordinary skill in the art without any creative effort shall belong to the protection scope of the present invention.

Requirements needing to be implemented by a full-electronic turnout security control system for a rail train-to-train communication in the present invention have the following several portions: 1. According to a turnout driving command transmitted by a resource manager, controlling a turnout to act to a normal position or an reverse position; 2. When the turnout is operated to a normal position, stopping driving the turnout; 3. If the turnout cannot be operated in-place due to some reasons, the system should stop driving the turnout after reaching a timeout period; 4. In the driving process of the turnout, if a reverse driving command transmitted by the resource manager is received, immediately perform the corresponding reverse driving command for driving the turnout towards an opposite direction; 5. Collecting representation information and monitoring information of the turnout and transmitting the representation information and monitoring information of the turnout to the resource manager and a maintenance system; 6. According to a turnout driving power source on/off command transmitted by the resource manager, controlling on and off of the turnout driving power source; and 7. Collecting on and off states of the turnout driving power source and transmitting such states to the resource manager.

In order to realize the above requirements, the system consists of the following several portions:

a communication module, wherein the communication module mainly realizes an external communication respectively with a resource manager and a maintenance system and an internal communication respectively with a turnout control module, a relay driving module and a relay collection module; The communication module is used for receiving a turnout control command and the turnout power source on or off command from the resource manager, and transmitting turnout representation information from the turnout control module and the turnout power source on or off state information of the relay collection module to the resource manager; In addition, monitoring information of the turnout control module, the relay driving module and the relay collection module are also transmitted to the maintenance system through the communication module;

The turnout control module takes controlling of rotation of a turnout and collecting of a turnout representation; The functions thereof are: (1) reading a turnout control command from the communication module and operating a turnout fixedly or reversely according to the command; (2) if a turnout cannot be started in a timeout period, the turnout control module should cut off a power source of the turnout; (3) for a turnout in a normal working state (no clamping rotation or blocking), once the turnout is started, if a control command is issued to interrupt or stop the turnout at the time, the turnout can also be driven continuously till completion of an action; (4) when the turnout control module receives an opposite driving command in a process of driving a turnout, the turnout should be controlled to be driven towards an opposite direction; (5) if the turnout cannot rotate in-place in a timeout period, the turnout control module should stop driving of the turnout after timeout; and (6) collecting representation information and monitoring information of the turnout (comprising a turnout driving current and a turnout representation of a power source voltage etc.) and transmitting the representation information and monitoring information of the turnout to the communication module, in which case no representation information is provided during a driving period;

A relay driving module, wherein the relay driving module is mainly used for driving a 480-type relay to turn on or off according to a turnout power source on or off command transmitted by the resource manager; In addition, the relay driving module transmits a driving command to the maintenance system through the communication module.

A relay collection module, wherein the relay collection module is mainly used for collecting an on or off state of the 480-type relay and respectively transmitting the state to the resource manager and the maintenance system through the communication module; and A 480-type relay, wherein the 480-type relay is mainly used for connecting the relay driving module, the relay collection module and a switch machine driving return line X4. When the relay driving module is driven to be turned on, the 480-type relay is turned on, in which case the relay collection module obtains an on state of the relay. When the relay driving module is driven to be turned off, the 480-type relay is turned off, in which case the relay collection module obtains an off state of the relay.

Figure 2:
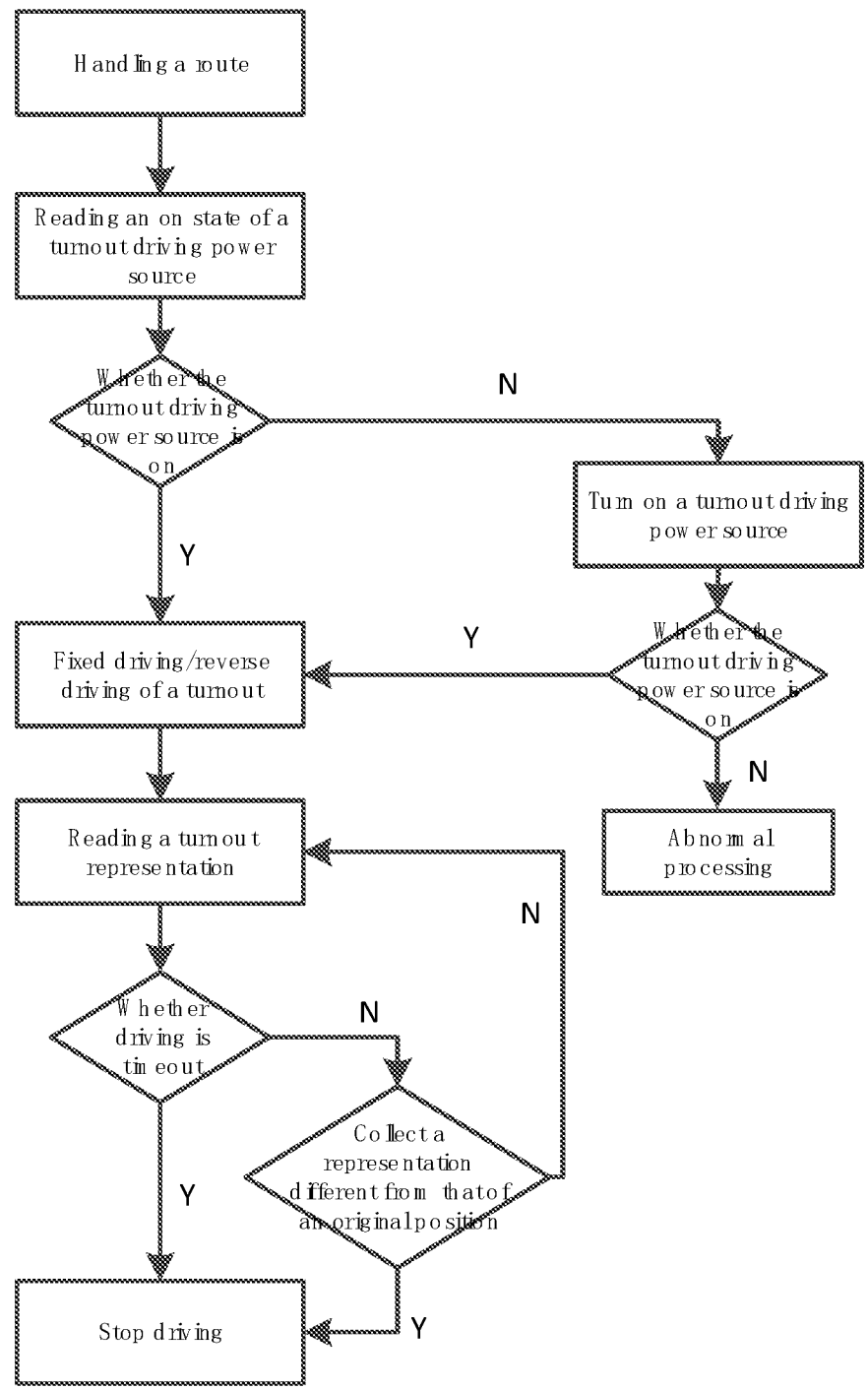
FIG. 2 is a work flow diagram of the present invention.

As shown in FIG. 2, the control system consisting of the above five portions is implemented in the following procedures:

(1) performing an energizing initialization on an entire system to complete self-checking;

(2) receiving, by a communication module, a 480-type relay on/off command and a turnout driving command from a resource manager, and transmitting the 480-type relay on/off command to a relay driving module and the turnout driving command to a turnout control module; controlling, by the relay driving module, to turn on/off a 480-type relay according to the 480-type relay on/off command; checking, by a turnout control module, whether the turnout driving command is a command for an operation at a normal position or for an operation at a reverse position and simultaneously checking a state of a switch machine, turning on a driving circuit of the switch machine, and starting to drive the switch machine till the switch machine is driven in-place or a timeout period is reached;

(3) continuously collecting, by the turnout control module, representation information and transmitting representation information and monitoring information to the communication module;

(4) continuously collecting, by the relay collection module, an on/off state of the 480-type relay and transmitting the state to the communication module; and (5) transmitting, by the communication module, turnout representation information and the on/off state of the 480-type relay to the resource manager, and further transmitting, by the communication module, turnout monitoring information and monitoring information of the relay driving module and the collection module to the maintenance system.

As shown in FIG. 1, a full-electronic turnout security control system for a train-to-train communication utilizes a full-electronic module combined with a relay for replacement of an air switch or PLC circuit to realize security control of the turnout driving power source, reducing construction difficulties and maintenance cost. The communication module in the system receives a turnout driving command and the turnout power source on/off command from the resource manager, and transmits these commands respectively to the turnout control module and the relay driving module. The relay driving module controls on and off of the turnout driving power source according to commands, and the turnout control module controls normal driving/reverse driving of the turnout according to the driving commands. The relay collection module collects on and off states of the turnout driving power source and then transmits such states to the resource manager through the communication module.

The communication module consists of an external network communication unit and an internal bus communication unit, communicates externally with the resource manager through the security communication protocol, and communicates internally with the turnout control module, the relay driving module and the relay collection module through the CAN protocol.

The relay driving module mainly consists of a driving unit and a reading-back unit, the driving unit is responsible for driving outside and the reading-back unit is responsible for collecting a driving result.

The relay collection module mainly comprises a collection unit, which is responsible for converting a collected analog signal into a digital signal.

The turnout control module consists of a driving unit and a representation information collection unit and carries on a checking unit that performs a periodic self-checking. As a result, the driving of the turnout comprising normal position operation and reverse position operation can be realized and a position state of a recovering turnout comprises a state of a normal position, a state of a reverse position and a state of no representation.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention should be determined with reference to the protection scope of the claims.

What is claimed is:

1. A full-electronic turnout security control system for a train-to-train communication, by comprising:
   a communication module for realizing an external communication respectively with a resource manager and a maintenance system and an internal communication respectively with a turnout control module, a relay driving module and a relay collection module;
   the turnout control module for controlling rotation of a turnout and collecting a turnout representation;
   the relay driving module for driving a relay to turn on or off according to a turnout power source on or off command transmitted by the resource manager;
   the relay collection module for collecting an on or off state of the collection relay and respectively transmitting the state to the resource manager and the maintenance system through the communication module; and
   a relay for connecting the relay driving module, the relay collection module and a switch machine driving return line.

2. The full-electronic turnout security control system for a train-to-train communication according to claim 1, wherein the communication module receives a turnout control command and the turnout power source on or off command from the resource manager, and transmits turnout representation information from the turnout control module and the turnout power source on or off state information of the relay collection module to the resource manager.

3. The full-electronic turnout security control system for a train-to-train communication according to claim 1, wherein monitoring information of the turnout control module, the relay driving module and the relay collection module are transmitted to the maintenance system through the communication module.

4. The full-electronic turnout security control system for a train-to-train communication according to claim 1, wherein the turnout control module obtains a turnout control command from the communication module and operates the turnout fixedly or reversely according to the command.

5. The full-electronic turnout security control system for a train-to-train communication according to claim 1, wherein if the turnout cannot be started in a timeout period, the turnout control module cuts off a power source of the turnout; and for the turnout in a normal working state, once the turnout is started, if the turnout control module issues a control command to interrupt or stop the turnout at the time, the turnout can also be driven continuously till completion of an action.

6. The full-electronic turnout security control system for a train-to-train communication according to claim 5, wherein when the turnout control module receives an opposite driving command in a process of driving a turnout, the turnout is controlled to be driven towards an opposite direction; and if the turnout cannot rotate in-place in a timeout period, the turnout control module stops driving of the turnout after timeout.

7. The full-electronic turnout security control system for a train-to-train communication according to claim 1, wherein the relay driving module transmits a driving command to the maintenance system through the communication module.

8. The full-electronic turnout security control system for a train-to-train communication according to claim 1, wherein the relay is a 480-type relay.

9. The full-electronic turnout security control system for a train-to-train communication according to claim 8, wherein when the relay driving module is driven to be turned on, the 480-type relay is turned on, in which case the relay collection module obtains an on state of the relay; and when the relay driving module is driven to be turned off, the 480-type relay is turned off, in which case the relay collection module obtains an off state of the relay.

10. A control method employing the full-electronic turnout security control system for a train-to-train communication according to claim 1, comprising:
   (1) performing an energizing initialization on an entire system to complete self-checking;
   (2) receiving, by the communication module, a 480-type relay on or off command and a turnout driving command from the resource manager, and transmitting the 480-type relay on or off command to the relay driving module and the turnout driving command to the turnout control module; controlling, by the relay driving module, to turn on or off a 480-type relay according to the 480-type relay on or off command; and checking, by the turnout control module, whether the turnout driving command is a command for an operation at a normal position or for an operation at a reverse position and simultaneously checking a state of a switch machine, turning on a driving circuit of the switch machine, and starting to drive the switch machine till the switch machine is driven in-place or a timeout period is reached;
   (3) continuously collecting, by the turnout control module, representation information and transmitting representation information and monitoring information to the communication module;
   (4) continuously collecting, by the relay collection module, an on or off state of the 480-type relay and transmitting the state to the communication module; and
   (5) transmitting, by the communication module, turnout representation information and the on or off state of the 480-type relay to the resource manager, and further transmitting, by the communication module, turnout monitoring information and monitoring information of the relay driving module and the collection module to the maintenance system.

\* \* \* \* \*